Figure 1:
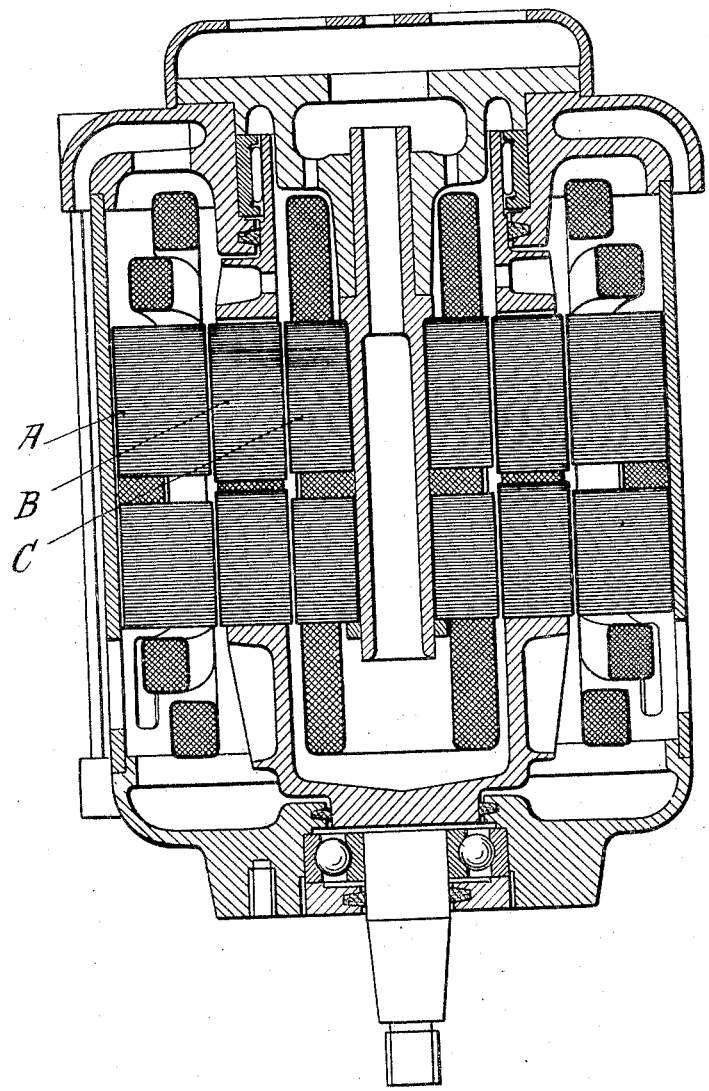

Oct. 23, 1934.     F. MORHARD     1,977,950
VARIABLE SPEED ELECTRIC MOTOR
Filed Jan. 12, 1933     2 Sheets-Sheet 1

Oct. 23, 1934. F. MORHARD 1,977,950
VARIABLE SPEED ELECTRIC MOTOR
Filed Jan. 12, 1933 2 Sheets-Sheet 2
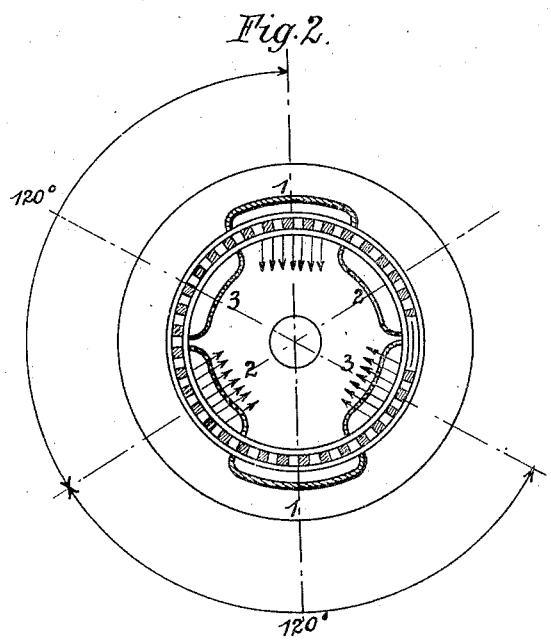
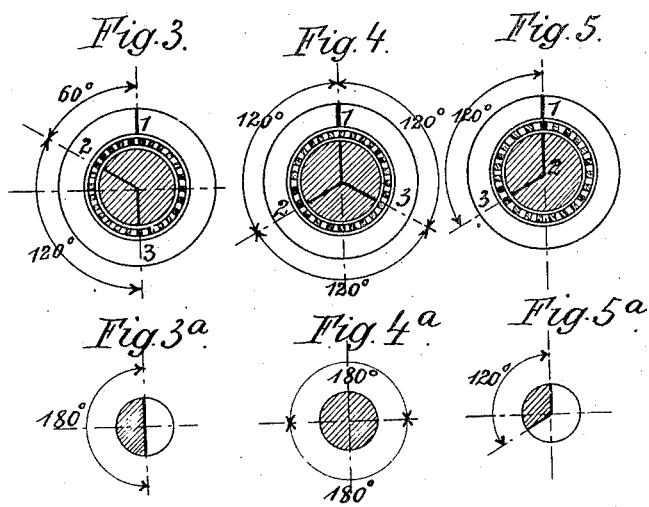
F. Morhard
INVENTOR Patented Oct. 23, 1934

1,977,950

UNITED STATES PATENT OFFICE 1,977,950

VARIABLE-SPEED ELECTRIC MOTOR

Friedrich Morhard, Russelsheim-on-the-Main, Germany

Application January 12, 1933, Serial No. 651,409
In Germany June 16, 1932

2 Claims. (Cl. 172—280)

One of the most important problems of machine design is the regulating of the speeds of revolution between the source of power and the working shaft. This problem is solved either by wheel gears or by hydraulic gears; the most varied kinds of friction gears and the like are likewise employed. Electrical gears of the most varied constructions are also to be found. All these gears have the disadvantage that they are comparatively expensive and difficult to manufacture. Furthermore also they always ultimately need an electric motor as a source of power. A great saving would be possible if the wheel gear or other regulating means could be eliminated.

Electrical gears in combination with wheel gears or electric motors with revolving outer windings for obtaining different speeds have become known. These rotating windings always require slip rings for the reception of current, which makes these gears very expensive. The combining of two pole-changeable electric motors or the arranging of a plurality of windings upon one stator for the same purpose are also too expensive, and could not be satisfactorily introduced; and furthermore they yield excessively large jumps in speed.

The present invention solves the problem by providing an electric motor which renders it possible, while avoiding any wheels or slip rings and other mechanical parts, to obtain a large range of speeds of revolution by purely electrical means.

The invention is illustrated by way of example in the accompanying drawings, in which Figure 1 shows a motor according to the invention in axial section; and Figures 2 to 5a are diagrams.

The electric motor shown in Figure 1 comprises a stationary outer winding A, and an inner winding C which is likewise stationary in use but is adjustable into a definite position in relation to the outer winding. Between the two windings runs the rotor B. Current can be supplied either to the outer winding or to the inner winding or to both at the same time. The rotor is therefore excited from the outer winding and from the inner winding. Now for the purpose of obtaining different speeds of revolution of the motor the two stators are wound in such a manner that the successive phases are located upon each of the stators alternately, the two windings admitting of being brought into special positions in relation to one another corresponding to the particular speed of revolution, by means for instance of an arm on the core of the inner stator C.

For a three-phase motor, for example, the arrangement of the winding to obtain different speeds of revolution is illustrated. Figure 2 shows the diagram of one winding of a three-phase motor. The phase 1 is placed upon the outer stator, while the phases 2 and 3 are placed upon the inner stator. The rotating field is produced by the outer and inner windings jointly.

From Figs. 4 and 4a it will be seen that in this position a completely revolving rotary field is produced, and the motor receives a corresponding speed of revolution. Figures 3 and 3a show the phases 2 and 3 of the inner stator shifted relatively to the phase 1. The rotary field no longer revolves completely, but only through 180°, as indicated in 3a. The motor adjusts itself correspondingly with the speed of revolution. In Figure 5 is shown a further position, in which the rotary field describes a path of 120°, as indicated in Figure 5a.

Hence according as the two windings are brought into a definite position in relation to one another there arises a joint rotary field, which acts upon the rotor and imparts to it a speed of revolution corresponding to the path of the rotary field, the torque remaining always approximately constant. If the motor is to have a constant power output at every speed of revolution, a plurality of the windings described above may be distributed upon the outer and inner stators, and switched on at the low speeds.

It will be understood that it is immaterial whether the two windings are inserted concentrically one in the other or are located side by side in disc form. The essence of the invention is not thereby affected.

What I claim is:—

1. A polyphase electric motor, comprising an outer stator, an inner stator, windings on the stators, and a rotor rotatable between the outer and inner stators, certain of the phases being wound on the outer and inner stators alternately.

2. A polyphase electric motor, comprising an outer stator, an inner stator, windings on the stators, and a rotor rotatable between the outer and inner stators, certain of the phases being wound on the outer and inner stators alternately, and the two stator windings being displaceable relatively to one another to vary the speed of the motor.

FRIEDRICH MORHARD.